United States Patent
Bäck et al.

(10) Patent No.: US 7,693,506 B1
(45) Date of Patent: Apr. 6, 2010

(54) METHOD AND SYSTEM FOR PERFORMING A LOCATION REGISTRATION IN A CELLULAR RADIOTELEPHONE SYSTEM

(75) Inventors: Juha Bäck, Helsinki (FI); Tony Hulkkonen, Helsinki (FI)

(73) Assignee: Nokia Corporation, Espoo (FI)

( * ) Notice: Subject to any disclaimer, the term of this patent is extended or adjusted under 35 U.S.C. 154(b) by 260 days.

(21) Appl. No.: 10/296,878

(22) PCT Filed: Jun. 14, 2000

(86) PCT No.: PCT/EP00/05479

§ 371 (c)(1),
(2), (4) Date: Jul. 22, 2003

(87) PCT Pub. No.: WO01/97548

PCT Pub. Date: Dec. 20, 2001

(51) Int. Cl.
*H04M 1/66* (2006.01)
*H04M 1/68* (2006.01)
*H04M 3/16* (2006.01)
*H04M 3/42* (2006.01)

(52) U.S. Cl. ............... 455/411; 455/414.1; 455/419; 455/421; 455/432.1; 455/433; 370/466; 370/503; 709/218; 709/230

(58) Field of Classification Search ............. 455/435.1, 455/436, 560, 432.1, 456.5, 411, 414.1, 419, 455/421, 433, 456.1, 558; 370/466, 503; 709/218, 230

See application file for complete search history.

(56) References Cited

U.S. PATENT DOCUMENTS

| 5,097,499 | A | * | 3/1992 | Cosentino | 455/435.1 |
| 5,983,102 | A | | 11/1999 | Gozes | 455/432 |
| 6,597,910 | B1 | * | 7/2003 | Ra | 455/433 |
| 6,819,926 | B2 | * | 11/2004 | Karlsson et al. | 455/433 |
| 7,224,971 | B2 | * | 5/2007 | Noguchi et al. | 455/435.1 |
| 7,251,472 | B2 | * | 7/2007 | Choi et al. | 455/411 |
| 7,286,852 | B2 | * | 10/2007 | Imura | 455/558 |
| 2002/0091797 | A1 | * | 7/2002 | Wallenius et al. | 709/218 |
| 2003/0027571 | A1 | * | 2/2003 | Karlsson et al. | 455/433 |

(Continued)

FOREIGN PATENT DOCUMENTS

EP 0472349 2/1992

(Continued)

OTHER PUBLICATIONS

Delory J-M, et al.; "Security & Saturation Solutions for GSM" Telephone Engineer & Management, Chicago, IL, vol. 95, No. 2, Jan. 15, 1991, pp. 50-52, 54.

(Continued)

*Primary Examiner*—William D Cumming
(74) *Attorney, Agent, or Firm*—Squire, Sanders & Dempsey, LLP (57) ABSTRACT

A method and system is disclosed for performing a location registration in a cellular communication network, wherein a subscriber identity of a user equipment is analyzed when a location registration request has been received, and a priority is allocated to the subscriber based on the result of the analysis. Then, the location registration request is admitted or rejected based on the allocated priority and a detected network load. Thereby, the network operator is able to guarantee network services for home subscribers in cases of increased network load.

19 Claims, 5 Drawing Sheets

U.S. PATENT DOCUMENTS

| | | | |
|---|---|---|---|
| 2004/0029587 A1* | 2/2004 | Hulkkonen et al. | 455/436 |
| 2004/0087305 A1* | 5/2004 | Jiang et al. | 455/432.1 |
| 2004/0192254 A1* | 9/2004 | Choi et al. | 455/411 |
| 2005/0027874 A1* | 2/2005 | Kim et al. | 709/230 |
| 2005/0070283 A1* | 3/2005 | Hashimoto et al. | 455/435.1 |
| 2005/0107094 A1* | 5/2005 | Hulkkonen et al. | 455/456.5 |
| 2005/0143059 A1* | 6/2005 | Imura | 455/419 |
| 2005/0190789 A1* | 9/2005 | Salkini et al. | 370/466 |
| 2005/0227690 A1* | 10/2005 | Noguchi et al. | 455/435.1 |
| 2005/0233745 A1* | 10/2005 | Noguchi et al. | 455/433 |
| 2005/0282572 A1* | 12/2005 | Wigard et al. | 455/522 |
| 2006/0098690 A1* | 5/2006 | Park | 370/503 |
| 2006/0099935 A1* | 5/2006 | Gallagher et al. | 455/414.1 |
| 2006/0114885 A1* | 6/2006 | Baek et al. | 370/352 |
| 2006/0121895 A1* | 6/2006 | Zou et al. | 455/433 |
| 2006/0135157 A1* | 6/2006 | Baek et al. | 455/433 |
| 2006/0252424 A1* | 11/2006 | Ohno et al. | 455/432.1 |
| 2006/0286979 A1* | 12/2006 | Enderlein et al. | 455/435.1 |
| 2007/0155374 A1* | 7/2007 | Yang | 455/421 |
| 2007/0202848 A1* | 8/2007 | Ishikawa et al. | 455/411 |
| 2007/0287419 A1* | 12/2007 | Wang | 455/411 |
| 2007/0293241 A1* | 12/2007 | Tamura | 455/456.1 |
| 2008/0039085 A1* | 2/2008 | Phan-Anh | 455/435.1 |
| 2008/0102794 A1* | 5/2008 | Keevill et al. | 455/411 |

FOREIGN PATENT DOCUMENTS

| | | |
|---|---|---|
| WO | 9815133 | 4/1998 |
| WO | WO 99/51047 | 10/1999 |
| WO | WO 01/97548 A1 * | 12/2001 |

OTHER PUBLICATIONS

3G TS 23.121, V3.3.0, (Mar. 2000); "Architectural Requirements for Release"; 1999.

3G TS 23.012, V3.2.1, (Mar. 2000); "Location Management Procedures"; 1999.

3G TS 23.060, V3.3.1, (May 2000); "General Packet Radio Service (GPRS)"; 1999.

* cited by examiner

METHOD AND SYSTEM FOR PERFORMING A LOCATION REGISTRATION IN A CELLULAR RADIOTELEPHONE SYSTEM

FIELD OF THE INVENTION

The present invention relates to a method and system for performing a location registration in a cellular communication network, such as a UMTS (Universal Mobile Telecommunications System) network.

BACKGROUND OF THE INVENTION

The continued growth of international travel for business and leisure leads to a significant increase in the number of subscribers roaming in mobile networks, such as UMTS (Universal Mobile Telecommunications system), GPRS (General Packet Radio Services) or GSM (Global System for Mobile communications) networks.

Every time a subscriber moves to a location or routing area served by a different VLR (Visitor Location Register) or SGSN (Serving GPRS Support Node), respectively, the subscriber data are downloaded from the HLR (Home Location Register) in the Home-PLMN (Public Land Mobile Network) to the new network entity serving the user, and deleted in the old VLR or SGSN. In this respect, the term "network entity" is used to designate any network element which may serve a mobile user and which may comprise a database for storing subscriber data. The HLR comprises a database in which all permanent subscriber data and all relevant temporary subscriber data for all mobile subscribers permanently registered in the HLR are stored. The VLR comprises a database in which all subscriber data required for call handling and other purposes for mobile subscribers currently located in the area controlled by the VLR are stored.

In order to support the subscriber identity confidentiality service, the VLRs allocate a unique TMSI (Temporary Mobile Subscriber Identity) to visiting mobile subscribers. Therefore, the VLR is capable of correlating the IMSI of a mobile station and the current TMSI for that mobile station. Similarly, in GPRS networks, a packet TMSI (P-TMSI) is used for identifying a mobile station. However, only a limited number of visiting subscribers can be handled by each VLR.

In case two different overlapping networks have been established by two network operators, e.g. the first network covers a certain small area (e.g. a city) and the second network covers a larger area including the small area, a roaming agreement may be made between the two network operators. Thereby, subscribers of the first network are allowed to get service also outside their home network in the second network. In the following, subscribers located outside their home network are called roaming subscribers.

Roaming agreements between overlapping networks may lead to a problem that one or more VLRs and/or SGSNs of the one network may become overloaded due to a high number of roaming subscribers from the other network. In such a case, new location registration requests for location or routing area updates even from own (i.e. non-roaming) subscribers have to be rejected. This results in a decreased quality of service or service reliability provided by network operators to their own subscribers. Hence, a mechanism is needed to guarantee service for own subscribers.

SUMMARY OF THE INVENTION

It is therefore an object of the present invention to provide a method and system for performing a location registration, by means of which service provision to own subscribers can be assured.

This object is achieved by a method for performing a location registration in a cellular communication network, said method comprising the steps of:

receiving a location registration request from a user equipment;

analyzing a subscriber identity of said user equipment;

allocating a priority to the subscriber based on the result of said analyzing step;

detecting a network load or network element load in said cellular communication network; and admitting or rejecting said location registration request based on said allocated priority and said detected network load or network element load.

Additionally, the above object is achieved by a network entity for performing a location registration procedure in a cellular communication network, said network entity comprising:

receiving means for receiving a location registration request from a user equipment;

priority allocation means for analyzing a subscriber identity of said user equipment and for allocating a priority to the subscriber based on the result of the analysis;

detecting means for detecting a network load or network element load in said cellular communication network; and decision means for allowing or rejecting said location registration request based on said allocated priority and said detected network load or network element load.

Accordingly a mechanism is provided where home subscribers are privileged in case of an overload due to roaming subscribers. If two operators have made a roaming agreement and the whole network or one of the MSC/VLRs (or SGSNs) is about to crash, the operator gives the privilege to its own subscribers. Thus, the operator can guarantee services for home subscribers in the case of a load caused by roaming subscribers.

The subscriber identity may be an IMSI. Thus, when the subscriber enters a new location or routing area and location registration is conducted, the network entity, e.g. MSC/VLR or SGSN, performs an IMSI analysis to determine the home network of the subscriber. Based on this analysis, the priority is allocated to the subscriber who has initiated the location registration.

In particular, a lower priority may be allocated to a roaming subscriber and a higher priority may be allocated to nonroaming subscriber, i.e. a subscriber having the cellular communication network as its home network. Thus, the location registration can be differentiated based on the priority allocated to the registered subscribers. In particular, a location registration request of a lower priority subscriber may be rejected and a location registration request of a higher priority subscriber may be admitted, if the detected network load indicates a capacity use higher than a first predetermined capacity of a subscriber database. As an example, the first predetermined capacity may be 80% of the maximum capacity. However, the threshold values should be controlled by the network operator.

As an additional measure, lower priority subscribers may be deleted from the subscriber database if the detected network load is higher than a second predetermined capacity of the subscriber database. As an example, the second predetermined capacity may be 90% of the maximum capacity. Thereby, the network entity can be adapted to the current load situation. When the first condition is true, location registration is rejected for all new roaming subscribers. Additionally, when the second condition is fulfilled, the database is cleaned up from the roaming subscribers indicated by their lower priority levels. The clean-up procedure may take the subscribers' home PLMN identity into account, i.e. roaming subscribers of some predefined PLMN(s) are cleaned first before other roaming subscribers.

Furthermore, a broadcast information may be transmitted from the cellular communication network via a broadcast channel, and used to indicate subscribers allowed or not allowed to roam in the cellular communication network. Then, the transmission of the location registration request may be inhibited if the broadcast information indicates that the subscriber of the user equipment is not allowed to roam in the cellular communication network. Thereby, the signaling load can be decreased, since the location registration signaling of those subscribers which are currently not allowed is not initiated. In particular, the allowed subscribers may be indicated by an allowed MCC and/or MNC.

The network entity may be a visitor location register or an SGSN. The location registration request may be a Location Area Update Request or a Routing Area Update Request.

Furthermore, the above object may be achieved by a user equipment for a cellular communication network, comprising:

message generating means for generating a location registration request for updating the location of said user equipment;

receiving means for receiving a broadcast message from said cellular communication network;

checking means for checking an information incorporated in said broadcast message and indicating subscribers allowed to roam in the cellular communication network;

wherein the message generating means initiates a selection process of another cellular communication network, if the checking result of the checking means indicates that the subscriber of the user equipment is not allowed to roam in the cellular communication network.

BRIEF DESCRIPTION OF THE DRAWINGS

In the following, the present invention will be described in greater detail on the basis of a preferred embodiment with reference to the accompanying drawings, in which.

DESCRIPTION OF THE PREFERRED EMBODIMENT

Figure 1A:
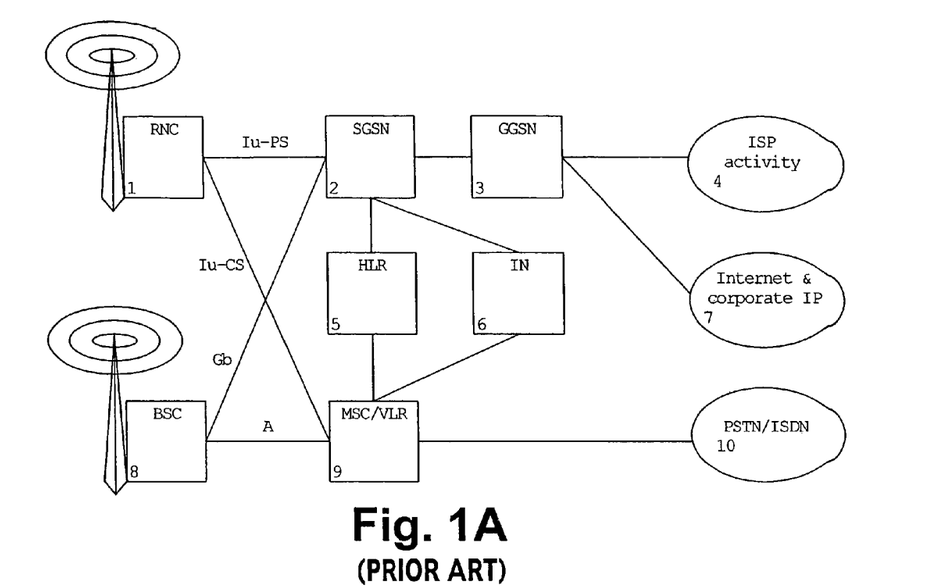
FIG. 1A shows a basic network architecture of a third generation cellular communication network.

The preferred embodiment will now be described on the basis of a third generation (3G) network architecture as shown in FIG. 1A.

According to FIG. 1A, the network architecture comprises a conventional GSM radio access network having at least one Base Station Controller (BSC) 8, a UMTS Terrestrial Radio Access Network (UTRAN) having at least one Radio Network Controller (RNC) 1, and a UMTS/GPRS core network (CN). The UTRAN (i.e. RNC 1) supports two logically separate signaling flows via an Iu interface to network nodes or entities of different types, e.g. an SGSN 2 and a Mobile Switching Center (MSC/VLR) 9 having an allocated VLR function. Thus, from a logical point of view, the CN consists of two service domains, a circuit-switched (CS) service domain with the MSC/VLR 9 as the main serving node and a packet-switched (PS) service domain with the SGSN 2 and a GPRS Gateway Support Node (GGSN) 3 as the main serving nodes.

A user equipment UE may support both CS and PS service domains. Thus, the user equipment UE may access the CS service domain (i.e. serving node MSC/VLR 9) either by the GSM access network (i.e. BSC 8) which is connected to the MSC/VLR 9 via an A interface or by the UTRAN (i.e. RNC 1) which is connected to the MSC/VLR 9 via an Iu-CS interface.

Additionally, the user equipment UE may access the PS service domain (i.e. serving node SGSN 2) either by the GSM access network (i.e. BSC 8) which is connected to the SGSN 2 via a Gb interface or by the UTRAN (i.e. RNC 1) which is connected to the SGSN 2 via an Iu-PS interface.

In the PS service domain, the user equipment UE may be connected via the SGSN 2 and the GGSN 3 to an Internet Service Provider (ISP) activity 4 or external PS networks 7 such as the Internet and/or a corporate IP (Internet Protocol) network. In the CS service domain, the user equipment UE may be connected via the MSC/VLR 9 to an external fixed CS network 10 such as a PSTN (Public Switched Telephone Network) or an ISDN (Integrated Services Digital Network).

The SGSN 2 is at the same hierarchical level as the MSC/VLR 9, keeps track of the location of a served individual user equipment UE, and performs security functions and access control. The GGSN 3 provides interworking with the external ISP activity 4 and PS networks 7, and is connected with the SGSN 2 via an IP-based GPRS backbone network. Furthermore, a HLR 5 is provided which can be accessed by the SGSN 2 and the MSC/VLR 9. The HLR 5 is arranged to store subscriber information relating to the CS and PS service domain. Additionally, an IN (Intelligent Network) function 6 may be provided as a programmable platform for providing operator-specific services in the CS and/or PS service domain.

For the mobility functionality, different registration area concepts are used in the above described network architecture. In the CN, location areas are used in relation to CS services, and routing areas are used in relation to PS services. Location areas are handled by CN entities or nodes (e.g. MSC/VLR 9) of the CS service domain. For a user equipment UE registered in a location area, this implies that the user equipment UE is registered in a specific CN node handling or serving this specific location area. Similarly, routing areas are handled by CN nodes (e.g. SGSN 2) of the PS service domain. For a user equipment UE registered in a routing area, this implies that the user equipment UE is registered in a specific CN node handling or serving this specific routing area. The routing area is used by the SGSN 2 for paging the user equipment UE. The location area is used by the MSC/VLR 9 for paging the user equipment UE. A PS service related temporary identity PS-TMSI is unique within a routing area, and a CS service related temporary identity CS-TMSI is unique within a location area.

When a registration area (e.g. location area or routing area) is changed, a location registration procedure (e.g. location area update or routing area update) is performed. In addition, periodic location registrations can be performed.

In a so-called CS idle state (i.e. the user equipment UE is reachable by paging for CS services), a location area update is initiated by the user equipment UE, independently of the PS state, to inform the CS service domain of the CN that a new location area has been entered. In case the new location area is in an area served by another CN node, the location area update also triggers the registration of the subscriber in the new CN node and a location update for CS services towards the HLR 5.

In a so-called PS idle state (i.e. the user equipment UE is reachable by paging for PS services), a routing area update is initiated by the user equipment UE, independently of the CS state, to inform the PS service domain of the CN that a new routing area has been entered. In case the new routing area is in an area served by another CN node, the routing area update also triggers the registration of the subscriber in the new CN node and a location update for PS services towards the HLR 5.

Figure 1B:
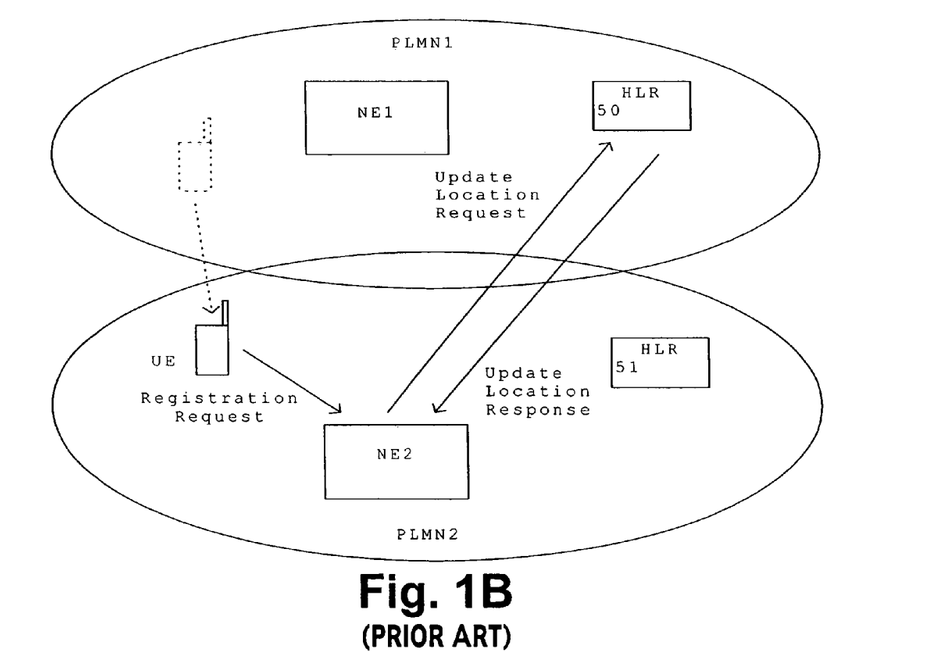
FIG. 1B shows a schematic diagram indicating a situation where a user equipment roams from a first into a second cellular network.

In the following, a location registration procedure of a subscriber of a user equipment UE roaming from a first cellular network PLMN1 to a neighboring second cellular network PLMN2 is described with reference to FIG. 1B. The two cellular networks PLMN1 and PLMN2 are operated by different network operators which have established a bilateral roaming agreement. In FIG. 1B, the first cellular network PLMN1 is the home network of the user equipment UE and comprises a HLR 50 in which the subscriber information of the user equipment UE is stored. Furthermore, the second cellular network PLMN2 also comprises a HLR 51 storing subscriber information of subscribers having the second cellular network PLMN2 as their home network. The two cellular networks PLMN1 and PLMN2 may be connected via e.g. an SS#7 (Signaling System No. 7) network.

In the situation shown in FIG. 1B, the user equipment UE is in the CS or PS idle mode and is roaming from a registration area (location area or routing area) controlled by a first network entity NE1 (e.g. MSC/VLR or SGSN) of the first cellular network PLMN1 to a registration area controlled by a second network entity NE2 (e.g. MSC/VLR or SGSN) of the second cellular network PLMN2. The first and second cellular networks PLMN1 and PLMN2 comprise a system information broadcasting function for supplying a Mobility Management (MM) registration area information to the user equipment UE via a broadcast channel. Based on a received registration area information, the user equipment decides whether to initiate a location registration.

In FIG. 1B, a location registration is initiated and the user equipment UE sends an initial location registration request (e.g. Location Area Update Request or Routing Area Update Request) including the old TMSI and the old Location Area Identifier (LAI) to the second network entity NE2 of the visited second cellular network PLMN2. Then, the second network entity NE2 requests the IMSI of the user equipment UE from the first network entity NE1 by using the received old LAI. Having received the IMSI, the second network entity NE2 informs the HLR 50 of the first cellular network PLMN1 of the change of the serving network entity by sending an Update Location Request including the IMSI and the number and address (e.g. MSC address and VLR number, or SGSN address and SGSN number) of the new network entity to the HLR 50. In response thereto, the HLR 50 instructs the first network entity NE1 to cancel the old context, by sending a Cancel Location message including the IMSI. The first network entity NE1 removes the old context and sends an acknowledge message. Then, the HLR 50 sends an Insert Subscriber Data message including the IMSI and subscription data of the user equipment UE to the second network entity NE2 which acknowledges the subscriber data insertion. Having received the acknowledgement, the HLR 50 acknowledges the location update by sending an Update Location Response to the second network entity NE2. The second network entity then validates the presence of the user equipment UE in the new registration area, and responds to the user equipment UE with an update accept message if all checks were successful.

Location registration procedures as described above may be performed at the change of a current registration area or when a periodic timer expires. During the location registration procedure, the network entity analyses the subscriber identity received with the location registration request, so as to determine the address of the HLR of the subscriber of the user equipment UE.

According to the preferred embodiment, the analysis of the subscriber identity is extended to allocate a priority to each subscriber initiating a location registration procedure. In a normal situation (i.e. no potential for a VLR or SGSN database overload), the priority allocated to the subscriber has no impact on the location registration. Nevertheless, the priority information may be stored in the database of the new network entity (MSC/VLR or SGSN). However, when a certain predefined network load condition is fulfilled (e.g. 80% of the capacity of the subscriber database of the new network entity is in use), the allocated priority would be considered in the location registration procedure. In particular, the location registration of subscribers with an allocated lower priority is rejected with an appropriate cause value. That is, a registration reject message incorporating a cause information is transmitted to the user equipment UE, if the predefined condition is fulfilled.

Furthermore, the network entities may have different functional modes depending on the current situation. E.g., when a first predetermined condition C1 (e.g. 80% of the capacity of the subscriber database in use) is met, location registration requests are rejected for all new roaming subscribers. Additionally, when a second predetermined condition C2 (e.g. 90% of the capacity of the subscriber database in use) is fulfilled, a clean-up operation for cleaning the database from the roaming subscribers (indicated by their allocated lower priority) is started. That is, roaming subscribers with a lower priority are deleted according to any suitable deleting scheme. Thus, based on the prevailing network load, the number of roaming subscribers can be limited or even reduced. Within the above condition, there may be several sub-steps. For example, when condition C2 is met, only the roaming subscribers from a predetermined set of PLMNs are cleaned up. If the load still remains above 90% for a predetermined period of time, the clean-up will be performed for subscribers from some other predetermined PLMNs (Public Land Mobile Networks). This implies that more than two levels of priority can be allocated to roaming subscribers.

Figure 2:
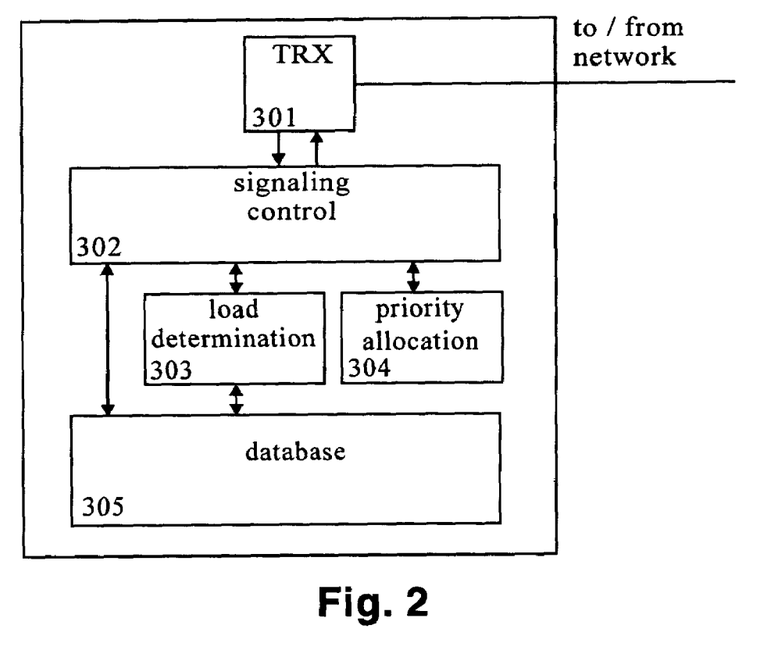
FIG. 2 shows a basic block diagram of a network entity for performing a location registration procedure according to the preferred embodiment of the present invention.

FIG. 2 shows a basic block diagram of a subscriber database such as the VLR database of the new MSC/VLR 9 or a database provided in the SGSN 2. According to FIG. 2, the subscriber database comprises a transceiver (TRX) 301 for transmitting and receiving messages and data to/from the network. The TRX 301 is connected to a signaling control unit 302 which interprets and generates messages and other signaling required for a location registration procedure and other procedures. The signaling control unit 302 is connected to a database 305 in which the required subscriber information is stored. When a location registration request is received by the MSC/VLR 9 or the SGSN 2 from the user equipment UE, a corresponding signaling is performed with the subscriber database, wherein the signaling control unit 302 supplies the subscriber identity to a priority allocation unit 304. The priority allocation unit 304 is arranged to analyze the subscriber identity (e.g. IMSI) so as to determined whether the location registration request is received from a roaming subscriber or a non-roaming subscriber (i.e. a subscriber having the concerned network entity as its home network). Further, in case of a roaming subscriber, the analysis may differentiate between different PLMNs, e.g. the priority allocated to subscribers of a first PLMN X may be higher than the priority allocated to subscribers of a second PLMN Y. The priority allocation unit 304 determines a corresponding priority and returns it to the signaling control unit 302. Then, the signaling control unit 302 stores the subscriber information together with the allocated priority in the database 305. Thereafter, the signaling control unit 303 interrogates a load determination unit 303 so as to determine the current network load or network element load (e.g. number of roaming subscribers stored in the database 305, or load of processors, signaling units message buses, etc.). The load determination may be performed e.g. by checking the used storage capacity in the database 305 or the load of respective elements. In particular, the load determination could be based on a checking operation of a memory address or pointer allocated to the latest or next subscriber. However, other known load determination schemes suitable e.g. for distributed computing and/or dynamic memory allocation schemes can be implemented. The signaling control unit 302 compares the determined capacity with predetermined load conditions and issues a corresponding signaling so as to admit or reject the location registration request based on the determined load or capacity level.

It is pointed out that the above order of processings may be reversed such that the load determination is performed prior to the priority allocation. In this case, the priority may be allocated based on the result of the load determination.

Additionally, the signaling control unit 302 may initiate a clean-up procedure for cleaning the database 305 from roaming subscribers if it determines that another higher capacity level has been exceeded. Thereby, the memory capacity or average memory capacity used in the database 305 can be kept at a predetermined level or range, so as to guarantee a capacity margin for services provided to home subscribers. The clean-up procedure may consist of a plurality of levels which may be selected based on the determined load situation.

Figure 4:
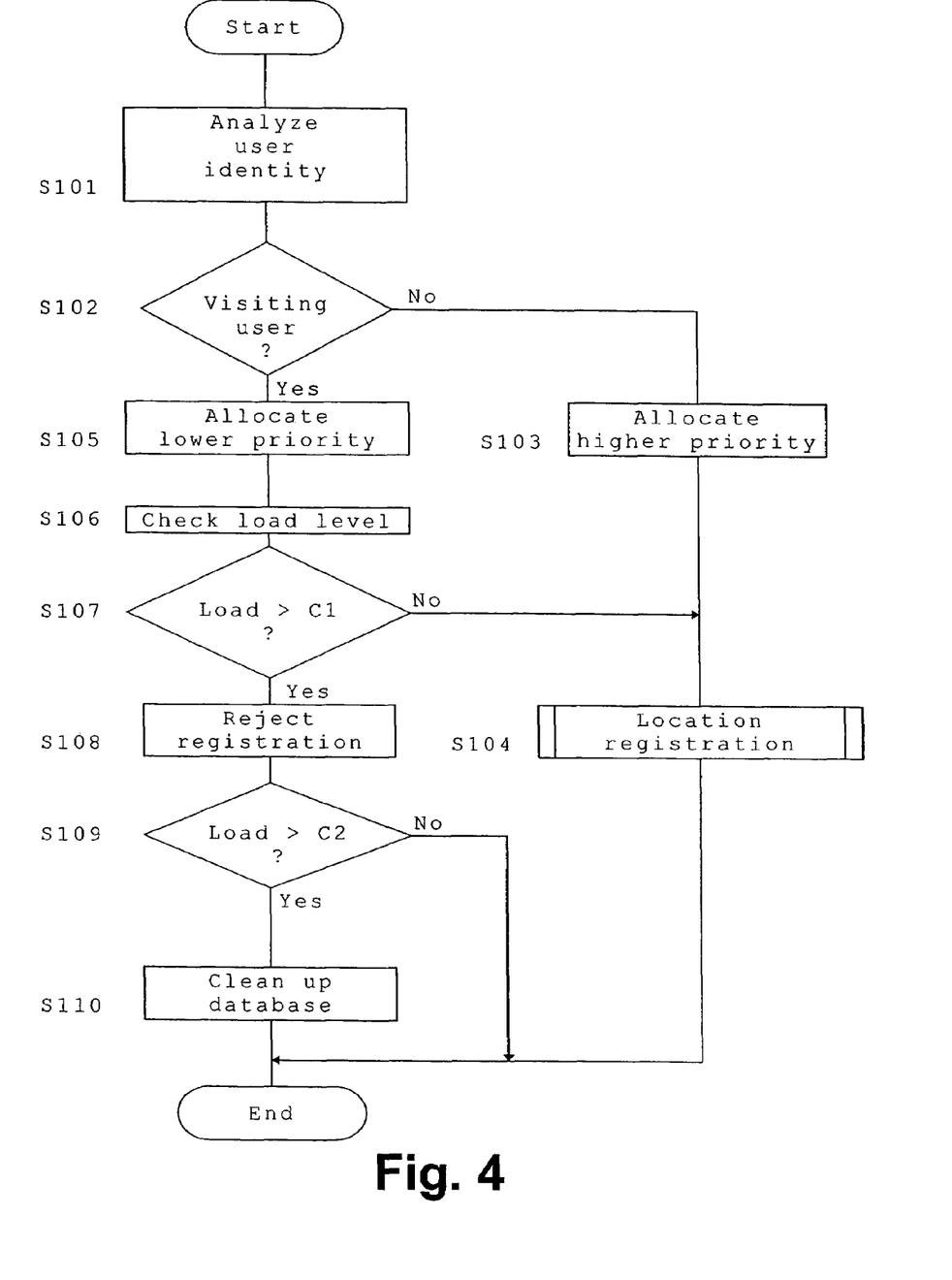
FIG. 4 illustrates a VLR or SGSN behavior regarding the handling of a location registration procedure according to the preferred embodiment of the present invention.

FIG. 4 illustrates the behavior of the MSC/VLR 9 or the SGSN 2 regarding handling of the location updating procedure.

When the receipt of the location registration request is signaled to the signaling control unit 302, the priority allocation unit 304 is controlled to analyze the user identity (step S101). If the priority allocation unit 304 determines in step S102 that the subscriber is not a visiting user (i.e. roaming subscriber) a higher or the highest priority is allocated to the subscriber in step S103. In case a visiting user or subscriber is determined in step S102, a lower priority is allocated in step S105. The allocated priority may be stored in the database 305. Then, the load determination unit 303 is controlled in step S106 so as to check the current load level, i.e. the memory capacity used in the database 305 or any other suitable load criteria. If it is determined in step S107 that the determined load level exceeds a first predetermined value or threshold C1, the signaling control unit 302 initiates a signaling in step S108 so as to reject the location registration. The threshold C1 may be e.g. 80% of the VLR or SGSN capacity (e.g. memory capacity of the database 305).

The rejection procedure may be a multiple level procedure, wherein subscribers of different PLMNs are rejected based on other predetermined threshold levels. For example, at a load level C1.1 the registrations of subscribers of PLMN A, B, and C are rejected, and at a load level C1.2 the registrations of the subscribers of PLMN D and E are rejected, and so on.

If it is determined in step S107 that the threshold C1 is not exceeded, the usual location registration procedure is performed in step S104. The same applies after the higher or highest priority allocation in step S103.

If the location registration has been rejected in step S108, the signaling control unit 302 determines in step S109 whether the current load (e.g. used data capacity) exceeds a second predetermined capacity or threshold C2. The second threshold C2 is set to be higher than the first threshold C1. In particular, the second threshold C2 may be 90% of the maximum VLR or SGSN capacity. If it is determined in step S109 that the second threshold C2 is exceeded, a clean-up procedure for deleting roaming subscribers from the database 305 is initiated in step S110 by the signaling control unit 302. If not, the procedure is terminated.

As already mentioned, the clean-up procedure of step 110 may also be a multiple level procedure, wherein subscribers of different PLMNs are deleted or cleaned up based on other predetermined threshold levels. For example, at a load level C2.1 the subscribers of PLMN A, B, and C are cleaned up, and at a load level C2.2 the subscribers of PLMN D and E are cleaned up, and so on.

The location registration procedure according to the preferred embodiment of the present invention may be further extended by features having an impact on the network selection of the user equipment UE. In particular, an information broadcast by the network could be changed dynamically based on the network load situation. This broadcast information may indicate those subscribers to the user equipment UE which are allowed or not allowed to roam in the network or in a predetermined part of the network (e.g. location or routing area). The change of the broadcast information may be initiated by any network entity arranged to determine the network load, e.g. by the MSC/VLR 9 or the SGSN 2.

In the following, the preferred embodiment is further developed by introducing such a dynamic broadcast function. This development may preferably be applied in a network, where the CN is able to dynamically change the information sent in the broadcast channel. UMTS is one example of such a network.

Figure 3:
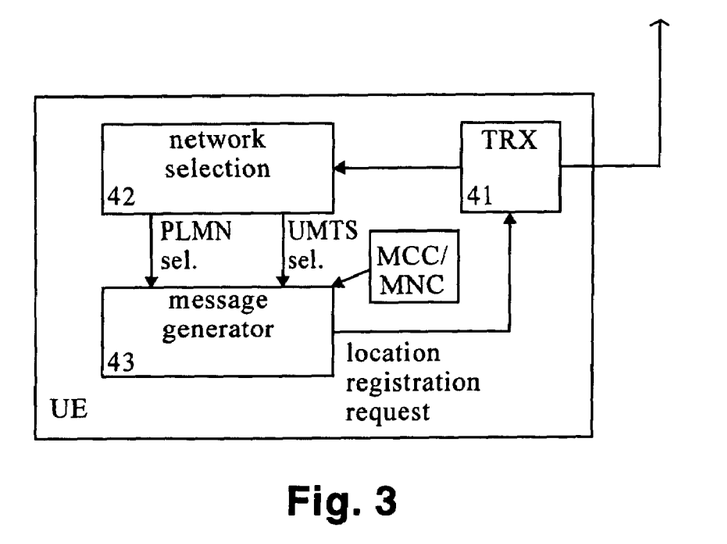
FIG. 3 shows a basic block diagram of a user equipment for performing a location registration procedure according to the preferred embodiment of the present invention.

FIG. 3 shows a basic block diagram of a user equipment in which a network selection function according to the preferred embodiment is provided. According to FIG. 3, the user equipment UE comprises a transceiver TRX 41 for transmitting and receiving messages and data via the radio interface to/from the cellular network. Broadcast messages received by the TRX 41 are supplied to a network selection unit 42 which checks an information included in the broadcast message and indicating subscribers allowed to roam in the network. This information may be transmitted via the broadcast channel (BCCH) and may comprise allowed Mobile Country Codes (MCCs) and/or Mobile Network Codes (MNCs) indicating home networks of subscribers allowed to roam in the network. This information is then extracted by the network selection unit 42 so as to determine whether the subscriber of the user equipment UE is allowed to roam in the network. If roaming is allowed, the network selection unit 42 supplies a control information indicating the selection of the concerned (e.g. UMTS) network to a message generator 43 which generates a corresponding location registration request (e.g. Location Area Update Request or Routing Area Update Request) and supplies it to the TRX 41 in order to be transmitted to the network. If the roaming is not allowed, the network selection unit 42 issues a control command indicating the selection of another network, e.g. a PLMN, to the message generator 43 which then initiates a PLMN selection process.

The determination of the roaming allowance in the network selection unit 42 may be based on a comparison of the received allowed MCCs and/or MNCs with the MCC and the MNC stored in the Subscriber Identity Module (SIM) inserted in the user equipment UE.

It is noted that the network selection unit 42 and the message generator 43 shown in FIG. 3 may be provided in a single unit, e.g. the USIM (UMTS Subscriber Identity Module) or the SIM.

Figure 5A:
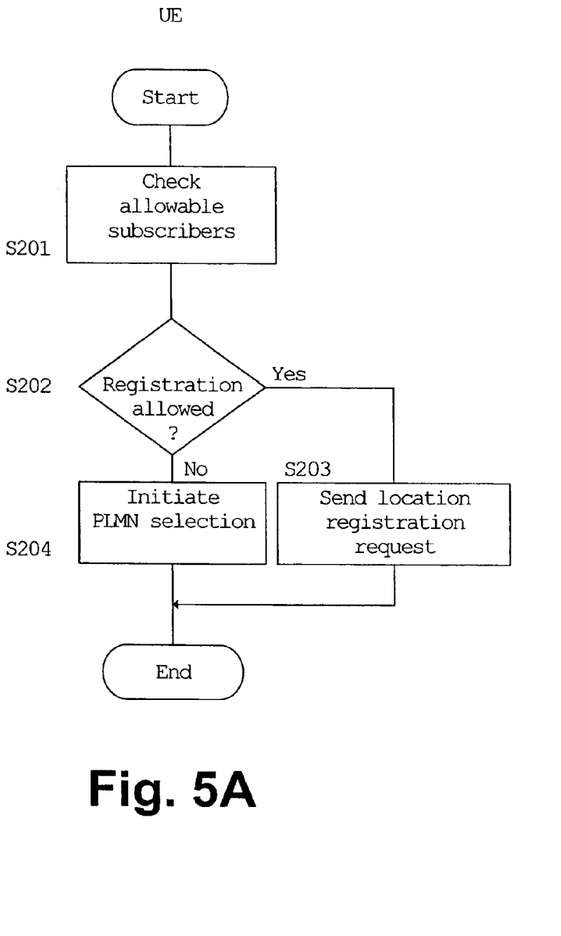
FIG. 5A shows a flow diagram of a location registration procedure in a user equipment according to the preferred embodiment.

FIG. 5A shows a block diagram of the selection operation performed in the user equipment UE.

In step S201, allowable subscribers are checked by comparing the received broadcast information indicating the allowed subscribers with the own subscriber information provided in the user equipment UE. If the network selection unit 42 determines in step S202 that the location registration procedure is allowed, the location registration request is transmitted to the new network entity, e.g. second network entity NE2 of FIG. 1B (step S203). If not, a PLMN selection is initiated by the message generator 43 in step S204. Thus, the signaling for the location registration procedure is only initiated if the subscriber of the user equipment UE is allowed to roam in the new network.

Figure 5B:
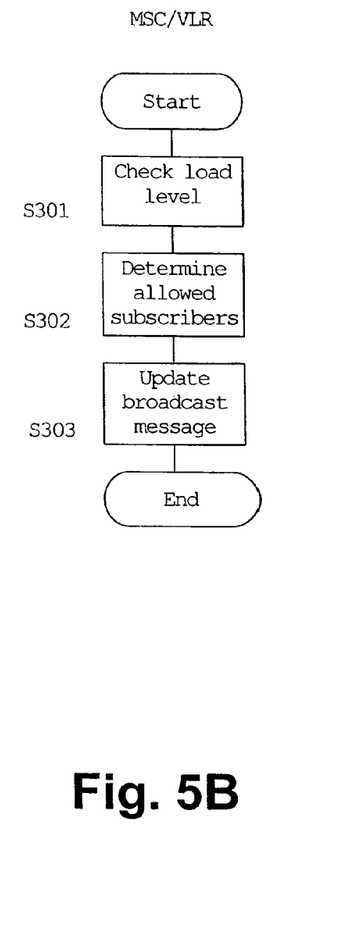
FIG. 5B shows a flow diagram of a broadcast message generation procedure in the network entity according to the preferred embodiment of the present invention.
Figure 6:
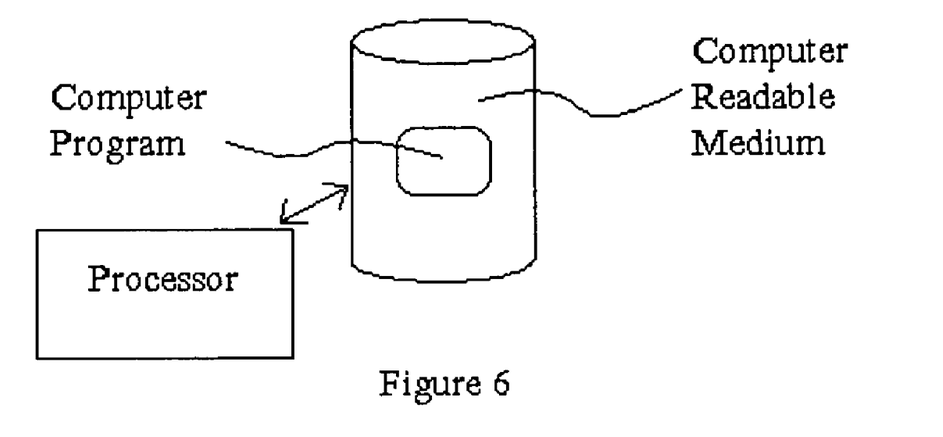
FIG. 6 shows a basic block diagram of a computer program embodied on a computer readable medium, the computer program being configured to control a processor.

FIG. 5B shows a flow diagram of a control procedure performed in the new network entity, e.g. second network entity NE2 of FIG. 1B. In the preferred embodiment, the signaling control unit 302 of the VLR or SGSN database is arranged to generate the dynamic broadcast message based on the current load level determined by the load determination unit 303.

According to FIG. 5B, the load level is checked in step S301. Then, allowed subscribers are determined in step S302 based on the current load level. The allowed subscribers may be determined on the basis of a comparison with predetermined load level thresholds, wherein the number of allowed subscribers may be reduced when a predetermined threshold is exceeded. Furthermore, a plurality of thresholds may be provided, wherein the number of allowed subscribers may successively be reduced when higher load thresholds are exceeded. Then, the signaling control unit 302 updates or generates the broadcast message in step S303. Thus, the allowed subscribers are updated in the broadcast message according to the current load situation in the network. The broadcast message may be generated in the MSC/VLR 9 and/or the SGSN 2.

Thus, based on the actual network load, a dynamic broadcast message can be generated. This dynamic broadcast message can be combined with the above priority allocation so as to provide an efficient tool for an operator to guarantee its network service for home subscribers in case of excessive network loads.

It is to be noted that the basic block diagrams shown in FIGS. 2 and 3 only comprise those components essential for performing the functions required for the present invention. Any other components of the network entities have been omitted for reasons of simplicity. Furthermore, the functions of the respective blocks shown in FIGS. 2 and 3 may be achieved by corresponding subroutines of a control program controlling a processing unit, e.g. CPU, arranged in the respective network entity.

Moreover, it is pointed out that the present invention is not limited to the preferred embodiment described above. It can be applied in any cellular communication network where a location registration, e.g. routing area or location area update, is performed in respective network entities. In particular, the priority allocation and/or dynamic broadcast message generation may be performed in any network entity (e.g. location register, switching center, GPRS Support Node (GSN) or the like) based on corresponding signaling with a subscriber database. Thus, the above description of the preferred embodiment and the accompanying drawings is only intended to illustrate the present invention. The preferred embodiment of the present invention may vary within the scope of the attached claims.

In summary, the present invention relates to a method and system for performing a location registration in a cellular communication network, wherein a subscriber identity of a user equipment is analyzed when a location registration request has been received, and a priority is allocated to the subscriber based on the result of the analysis. Then, the location registration request is admitted or rejected based on the allocated priority and a detected network load. Thereby, the network operator is able to guarantee network services for home subscribers in cases of increased network load.

The invention claimed is:

1. A method, comprising:
performing a location registration in a cellular communication network;
receiving a location registration request from a user equipment;
analyzing a subscriber identity of said user equipment;
allocating a priority to the subscriber based on the result of said analyzing;
detecting a network load or network element load in said cellular communication network;
admitting or rejecting said location registration request based on said allocated priority and said detected network load or network element load;
indicating subscribers allowed or not allowed to roam in said cellular communication network in a broadcast information transmitted via a broadcast channel;
rejecting a location registration request of a lower priority subscriber and admitting a location registration request of a higher priority subscriber, when said detected network load indicates a capacity use higher than a first predetermined capacity of a subscriber database; and
configuring said first predetermined capacity to be an operator-controlled value.

2. The method according to claim 1, wherein the analyzing said subscriber identity comprises analyzing an international mobile subscriber identity.

3. The method according to claim 1, further comprising:
allocating a lower priority to a roaming subscriber and a higher priority to a non-roaming subscriber.

4. A method, comprising:
performing a location registration in a cellular communication network;
receiving a location registration request from a user equipment;
analyzing a subscriber identity of said user equipment;
allocating a priority to the subscriber based on the result of said analyzing;
detecting a network load or network element load in said cellular communication network;
admitting or rejecting said location registration request based on said allocated priority and said detected network load or network element load;
indicating subscribers allowed or not allowed to roam in said cellular communication network in a broadcast information transmitted via a broadcast channel;
deleting lower priority subscribers from said subscriber data-base when said detected network load is higher than a second predetermined capacity of said subscriber database; and
said second predetermined capacity to be an operator-controlled value.

5. The method according to claim 1, further comprising:
inhibiting the transmission of said location registration request, when said broadcast information indicates that the subscriber of said user equipment is not allowed to roam in said cellular communication network.

6. The method according to claim 1, wherein the receiving said location registration request comprises receiving a location area update request or a routing area update request.

7. An apparatus, comprising:
a receiver configured to receive a location registration request from a user equipment;
a priority allocator configured to analyze a subscriber identity of said user equipment and to allocate a priority to the subscriber based on a result of analyzing the subscriber identity;
a determiner configured to determine a network load or network element load in a cellular communication network;
a decider configured to allow or reject said location registration request based on said allocated priority and said detected network load or network element load; and
a message generator configured to generate a broadcast message configured to indicate subscribers allowed or not allowed to roam in said cellular communication network,
wherein said apparatus is a visitor location register or a serving general packet radio services support node.

8. An apparatus, comprising:
a receiver configured to receive a location registration request from a user equipment;
a priority allocator configured to analyze a subscriber identity of said user equipment and to allocate a priority to the subscriber based on a result of analyzing the subscriber identity;
a determiner configured to determine a network load or network element load in a cellular communication network;
a decider configured to allow or reject said location registration request based on said allocated priority and said detected network load or network element load; and
a message generator configured to generate a broadcast message configured to indicate subscribers allowed or not allowed to roam in said cellular communication network,
wherein said subscriber identity is an international mobile subscriber identity.

9. An apparatus, comprising:
a receiver configured to receive a location registration request from a user equipment;
a priority allocator configured to analyze a subscriber identity of said user equipment and to allocate a priority to the subscriber based on a result of analyzing the subscriber identity;
a determiner configured to determine a network load or network element load in a cellular communication network;
a decider configured to allow or reject said location registration request based on said allocated priority and said detected network load or network element load; and
a message generator configured to generate a broadcast message configured to indicate subscribers allowed or not allowed to roam in said cellular communication network,
wherein said priority allocator is configured to allocate a lower priority to a roaming subscriber and a higher priority to a non-roaming subscriber.

10. An apparatus, comprising:
a receiver configured to receive a location registration request from a user equipment;
a priority allocator configured to analyze a subscriber identity of said user equipment and to allocate a priority to the subscriber based on a result of analyzing the subscriber identity;
a determiner configured to determine a network load or network element load in a cellular communication network;
a decider configured to allow or reject said location registration request based on said allocated priority and said detected network load or network element load; and
a message generator configured to generate a broadcast message configured to indicate subscribers allowed or not allowed to roam in said cellular communication network,
wherein said decider is configured to reject a location registration request of a lower priority subscriber and to admit a location registration request of a higher priority subscriber when said detected network load indicates a capacity use higher than a first predetermined capacity of a subscriber database.

11. The apparatus according to claim 10, wherein said first predetermined capacity is an operator-controlled value.

12. An apparatus, comprising:
a receiver configured to receive a location registration request from a user equipment;
a priority allocator configured to analyze a subscriber identity of said user equipment and to allocate a priority to the subscriber based on a result of analyzing the subscriber identity;
a determiner configured to determine a network load or network element load in a cellular communication network;
a decider configured to allow or reject said location registration request based on said allocated priority and said detected network load or network element load; and
a message generator configured to generate a broadcast message configured to indicate subscribers allowed or not allowed to roam in said cellular communication network,
wherein said decider is configured to delete lower priority subscribers from said subscriber database, when said detected network load is higher than a second predetermined capacity of said subscriber database, and
wherein said second predetermined capacity is an operator-controlled value.

13. The apparatus according to claim 7, wherein said location registration request is a location area update request or a routing area update request.

14. The method according to claim 4, wherein the analyzing said subscriber identity comprises analyzing an international mobile subscriber identity.

15. The method according to claim 4, further comprising:
allocating a lower priority to a roaming subscriber and a higher priority to a -non-roaming subscriber.

16. The method according to claim 4, further comprising:
inhibiting the transmission of said location registration request, when said broadcast information indicates that the subscriber of said user equipment is not allowed to roam in said cellular communication network.

17. The method according to claim 4, wherein the receiving said location registration request comprises receiving a location area update request or a routing area update request.

18. A computer program embodied on a computer readable medium, the computer program being configured to control a processor to perform:
performing a location registration in a cellular communication network;
receiving a location registration request from a user equipment;
analyzing a subscriber identity of said user equipment;
allocating a priority to the subscriber based on the result of said analyzing;
detecting a network load or network element load in said cellular communication network;
admitting or rejecting said location registration request based on said allocated priority and said detected network load or network element load;
indicating subscribers allowed or not allowed to roam in said cellular communication network in a broadcast information transmitted via a broadcast channel;
rejecting a location registration request of a lower priority subscriber and admitting a location registration request of a higher priority subscriber, when said detected network load indicates a capacity use higher than a first predetermined capacity of a subscriber database; and
configuring said first predetermined capacity to be an operator-controlled value.

19. A computer program embodied on a computer readable medium, the computer program being configured to control a processor to perform:
performing a location registration in a cellular communication network;
receiving a location registration request from a user equipment;
analyzing a subscriber identity of said user equipment;
allocating a priority to the subscriber based on the result of said analyzing;
detecting a network load or network element load in said cellular communication network;
admitting or rejecting said location registration request based on said allocated priority and said detected network load or network element load;
indicating subscribers allowed or not allowed to roam in said cellular communication network in a broadcast information transmitted via a broadcast channel:
deleting lower priority subscribers from said subscriber data-base when said detected network load is higher than a second predetermined capacity of said subscriber database: and
configuring said second predetermined capacity to be an operator-controlled value.

* * * * *